US008865794B2

(12) United States Patent
Wallace et al.

(10) Patent No.: US 8,865,794 B2
(45) Date of Patent: Oct. 21, 2014

(54) ANAEROBIC ADHESIVE COMPOSITIONS HAVING MICROENCAPSULATED METAL IONS

(75) Inventors: Richard Wallace, Birmingham, MI (US); James A. Barr, Rochester Hills, MI (US)

(73) Assignee: ND Industries, Inc., Clawson, MI (US)

(*) Notice: Subject to any disclaimer, the term of this patent is extended or adjusted under 35 U.S.C. 154(b) by 362 days.

(21) Appl. No.: 12/059,730

(22) Filed: Mar. 31, 2008

(65) Prior Publication Data

US 2008/0242764 A1 Oct. 2, 2008

Related U.S. Application Data

(60) Provisional application No. 60/909,594, filed on Apr. 2, 2007.

(51) Int. Cl.
| | | |
|---|---|---|
| *C08K 9/00* | (2006.01) | |
| *B32B 27/32* | (2006.01) | |
| *C08K 9/10* | (2006.01) | |
| *B32B 27/36* | (2006.01) | |
| *B32B 27/30* | (2006.01) | |

(52) U.S. Cl.
CPC ............ *B32B 27/30* (2013.01); *B32B 27/32* (2013.01); *C08K 9/10* (2013.01); *B32B 27/36* (2013.01)
USPC ........................... 523/200; 523/176; 524/90

(58) Field of Classification Search
USPC ..................... 524/90; 523/176, 200
See application file for complete search history.

(56) References Cited

U.S. PATENT DOCUMENTS

| | | | | |
|---|---|---|---|---|
| 3,451,980 A | * | 6/1969 | Brownstein | 528/335 |
| 4,092,376 A | * | 5/1978 | Douek et al. | 525/101 |
| 4,093,556 A | * | 6/1978 | Wojciak | 427/213.34 |
| 4,320,221 A | * | 3/1982 | Hoffman | 528/69 |
| 4,374,940 A | * | 2/1983 | Bhatia | 523/176 |
| 4,497,916 A | | 2/1985 | Cooke et al. | 523/176 |
| 4,581,427 A | * | 4/1986 | Dunn et al. | 526/147 |
| 4,847,113 A | | 7/1989 | Wallace | 427/54.1 |
| 5,000,636 A | | 3/1991 | Wallace | 411/258 |
| 5,202,365 A | | 4/1993 | Wallace | 523/463 |
| 5,250,600 A | * | 10/1993 | Nguyen et al. | 524/377 |
| 5,308,922 A | | 5/1994 | Wallace et al. | 174/87 |
| 5,426,130 A | | 6/1995 | Thurber et al. | 522/14 |
| 5,565,499 A | | 10/1996 | Klemarczyl et al. | 522/13 |
| 5,585,414 A | | 12/1996 | Klemarczyl et al. | 522/13 |
| 5,999,636 A | | 12/1999 | Juang | 411/258 |
| 6,342,545 B1 | | 1/2002 | Klemarczyl et al. | 523/176 |
| 6,509,394 B1 | * | 1/2003 | Maandi | 523/205 |
| 6,607,631 B1 | * | 8/2003 | Badejo et al. | 156/327 |
| 7,115,676 B2 | * | 10/2006 | Woods et al. | 523/176 |
| 7,146,897 B1 | | 12/2006 | Attarwala et al. | 86/19.8 |
| 7,199,249 B2 | | 4/2007 | Liu et al. | 548/406 |
| 7,976,670 B2 | | 7/2011 | Malofsky et al. | 156/331.8 |
| 2003/0032736 A1 | * | 2/2003 | Kneafsey et al. | 525/418 |
| 2003/0162857 A1 | * | 8/2003 | Wojciak et al. | 522/7 |
| 2005/0245643 A1 | | 11/2005 | Gan et al. | 523/400 |
| 2006/0096535 A1 | | 5/2006 | Haller et al. | 118/719 |

FOREIGN PATENT DOCUMENTS

| | | |
|---|---|---|
| EP | 0 077 659 | 1/1987 |
| EP | 0 548 369 B1 | 9/1995 |
| GB | 2 255 781 A | 11/1992 |

\* cited by examiner

*Primary Examiner* — Hannah Pak
(74) *Attorney, Agent, or Firm* — Warner Norcross & Judd LLP

(57) ABSTRACT

An enhanced anaerobic adhesive composition containing microencapsulated metal ions is disclosed. Microencapsulated metal ions, such as iron oxide, copper naphthenate, cobalt naphthenate, ferrocene, and ferrocene derivatives, act as bonding sites in the composition, such that the composition achieves more complete polymerizations in a shorter curing time. The curing properties and the cure quality are significantly improved by the inclusion of microencapsulated metal ions. The composition can be used to bond metal and plastic substrates.

8 Claims, No Drawings

ANAEROBIC ADHESIVE COMPOSITIONS HAVING MICROENCAPSULATED METAL IONS

CROSS-REFERENCE TO RELATED APPLICATIONS

This application claims the benefit of Provisional application 60/909,594 filed Apr. 2, 2007, the entire content of which is expressly incorporated herein by reference thereto.

FIELD OF THE INVENTION

The present invention relates generally to anaerobic adhesive compositions, and more specifically, anaerobic adhesive compositions used to join or bond metal and non-metal substrates.

BACKGROUND OF THE INVENTION

It is known that metal substrates can be joined with an anaerobic adhesive composition. Anaerobic adhesive compositions are well known for their ability to remain in a liquid, unpolymerized state in the presence of oxygen and to cure to a solid state in the absence of oxygen. To bond substrates with an anaerobic adhesive composition, the composition is coated on the surfaces to be joined, and the surfaces are brought tightly together to remove air (and oxygen) from around the composition to induce polymerization of the composition and formation of a definitive bond.

Anaerobic adhesive compositions, also referred to as "anaerobic resins," are widely used in the field of mechanics to bond substrates and to join various mechanical parts, such as wheels, pulleys, or ball bearings on their axles. As such, anaerobic adhesive compositions are used to replace traditional bonding techniques such as press assembly, banding, and brazing, and to eliminate the need for supplementary joining pieces such as keys, pins, washers and locking screws. Anaerobic adhesive compositions also have an important role as sealing and gasketing adhesives, and to retain and tighten fastening systems such as screws, nuts, bolts, pins, and the like.

Anaerobic adhesive compositions are generally based on polymerizable polyacrylic ester or acrylate monomers, such as alkylene glycol diacrylate, which are capable of radical polymerization at room temperature.

The compositions also contain a cure system that improves the speed and/or the bond strength of the composition. Various cure systems have been developed, primarily focusing on efficiently performing the redox reaction, which is the basis for anaerobic chemistry. Cure systems generally include organic peroxides or hydroperoxides as an activator of the polymerization reaction. Such peroxide compounds are known to serve as a catalyst to generate free radicals, which initiate free radical curing of the polymerizable anaerobic adhesive monomers.

To increase the speed at which peroxide free radicals are generated, and to speed up the completion of the cure, an acidic reducing agent is commonly used as an accelerator for the peroxide. Typical accelerators include amines and imides, such as tertiary amines, polyamines, cyclicamines and arylamines. Various other nitrogen compounds, including hydrazine derivatives such as ethyl carbazate, N-aminorhodanine, acetylphenylhydrazine, para-nitrophenylhydrazine, and para-tolysulfonylhydrazide, have also been suggested to increase the setting speed on ferrous substrates, but at the price of poor storage stability. It is also difficult to achieve polymerization of an anaerobic adhesive composition on non-ferrous surfaces or treated surfaces, such as galvanized or bichromated steel, with most hydrazine derivatives. To further improve the cure speed, various combinations of compounds, in various relative amounts, have also been explored as accelerators. Identifying an optimal cure system from such combinations is, however, a complex and unpredictable process.

Further, to join substrates made of "slow" or relatively inactive materials such as stainless steel, zinc, dichromate, and cadmium, the substrate may have to be coated with a separate primer coating before applying the adhesive composition. Using a primer coating, however, is disadvantageous, since it requires an additional step that is inconvenient and costly. It also requires a solvent that can be environmentally harmful, which would require special handling and disposal.

Thus, it would be desirable to provide an anaerobic adhesive composition with improved curing and bonding properties and that is simple to manufacture and use. It would be further desirable to provide an anaerobic adhesive composition that can be used to join a wide variety of substrate materials without requiring a separate primer coating or other special treatments.

SUMMARY OF THE INVENTION

The invention relates to an enhanced anaerobic adhesive composition containing microencapsulated metal ions, wherein the microencapsulated metal ions provide enhanced curing properties, e.g., shorter curing time and increased bonding strength, compared to a composition that does not contain such metal ions.

The composition according to the invention comprises a reactive component including an anaerobically curable acrylate monomer, such as methacrylate, polyglycol methacrylate, polyglycol dimethacrylate, polyethylene glycol ester, polyester resin, or a combination thereof, in an amount sufficient to provide adhesivity after polymerization; a free radical activator such as a hydrogen hydroxide that is capable of initiating radical polymerization of the monomer; and microencapsulated metal ions, such as metal ions are provided from iron oxide, copper naphthenate, cobalt naphthenate, ferrocene, ferrocene derivatives, or a combination thereof, in an amount sufficient to enhance anaerobic polymerization of the monomer. In an embodiment, the composition comprises the monomer in an amount of about 60 to about 90%, the activator in an amount of about 0.1 to about 10%, and the metal ions in an amount in an amount of about 0.1 to about 7%, each by weight of the composition.

In a further embodiment, the composition further comprises at least one additional additive such as a reducing agent (e.g., saccharin), an accelerator (e.g., saccharin and amines such as alkyl toluidine), a stabilizer and/or oxidation inhibitor (e.g., phenols), a chelating agent (e.g., ethylenediamine tetraacetic acid), a friction reducer (e.g., polytetrafluoroethylene (PTFE), polyethylene), and a thickening agent (e.g., silica). For example, the reducing agent can be present in an amount of about 0.1 to about 10%, the accelerator can be present in an amount of about 0.1 to about 5%, the friction reducer can be present in an amount of about 1 to about 10%, and the thickening agent can be present in an amount of about 0.1 to about 15%, each by weight of the composition.

According to the invention, microencapsulated metal ions can be added to any anaerobic adhesive composition to enhance its curing properties and bonding performance on various substrates, including metal substrates and non-metal substrates, such as plastic substrates. Thus, in an embodiment, the invention provides a method of enhancing the cure speed and bonding strength of an anaerobic adhesive composition by adding microencapsulated metal ions to the anaerobic adhesive composition, wherein the microencapsulated metal ions provide the enhanced cure speed and bonding strength compared to an anaerobic adhesive composition that does not include microencapsulated metal ions. Further, the invention provides a method of bonding substrates having mating surfaces, by applying the anaerobic adhesive composition containing microencapsulated metal ions according to the invention on the mating surfaces of the substrates and mating the surfaces.

DESCRIPTION OF THE PREFERRED EMBODIMENTS

The invention provides enhanced anaerobic adhesive compositions that include microencapsulated metal ions. Microencapsulated metal ions incorporated in anaerobic adhesive compositions according to the invention act as bonding sites during the polymerization of the monomers in the compositions, and therefore enable the compositions to achieve more complete polymerization in a shorter amount of time. Thus, compositions according to the invention provide higher-strength, higher-quality bonding with substrates in a shorter curing time, compared to compositions that do not include microencapsulated metal ions. Further, because of such improved bonding, the compositions according to the invention can be used to join not only metal substrates, but substrates of other materials, such as plastic substrates, that could not be joined with heretofore known anaerobic adhesive compositions.

Advantageously, microencapsulated metal ions according to the invention can be used with any known anaerobic adhesive compositions. Known anaerobic adhesive compositions include a reactive component of polyolefinically unsaturated monomers such as acrylic resins, including methacrylic resins, which are anaerobically curable. Useful anaerobically curable monomers include alkylene glycol diacrylates having the following general formula:

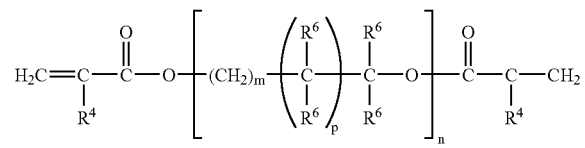

wherein $R^4$ is selected from the group consisting of hydrogen, halogen, and lower alkyl of 1-4 carbon atoms; $R^5$ is selected from the group consisting of hydrogen, —OH,

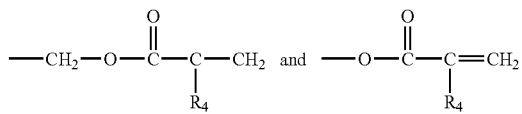

$R^6$ is a radical selected from the group consisting of hydrogen, lower alkyl of 1-4 carbon atoms, hydroxyalkyl of 1-4 carbon atoms, and m is an integer equal to at least 1, desirably 1-8 and more desirably from 1 to 4; n is an integer equal to at least 1, desirably, 1 to 20; and p is 0 or 1.

Typical of these monomers include methacrylate monomer; mono-, di-, tri- tetra- and polyethylene glycol dimethacrylate and the corresponding diacrylates; di(pentamethylene glycol) dimethacrylate; tetra-ethylene glycol di(chloroacrylate); diglycerol diacrylate; diglycerol tetramethacrylate; butylene glycol dimethacrylate; neopentyl glycol diacrylate; and trimethylopropane triacrylate. Particularly useful polymerizable resins include ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopertyl glycoldiacrylate, pentaerythritol tetra-acrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate, and combinations thereof.

Other useful monomers include urethane-acrylate type monomers; acrylates derived from aromatic diols such as bisphenol-A (e.g., bisphenol-A dimethacrylate, hydrogenated bisphenol-A dimethacrylate, and ethoxylated bisphenol-A dimethacrylate); and monofunctional acrylate esters (esters containing one acrylate group) and di- and other polyacrylate esters. When dealing with monofunctional acrylate esters, it is desirable to use an ester which has a relatively polar alcoholic moiety. Such esters are less volatile than low molecular weight alkyl esters. Further, the polar group tends to provide intermolecular attraction during and after cure, thus producing more desirable cure properties, as well as a more durable sealant or adhesive when the composition is cured. Polar groups selected from labile hydrogen, heterocyclic ring, hydroxy, amino, cyano, and halogen polar groups are especially useful. Examples of compounds within this category include cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate. These compounds are often incorporated as reactive diluents that are capable of copolymerizing with various other polymerizable materials.

The reactive component can also contain multifunctional acrylates and methacrylates, which contain in the nonacrylic part of their molecule chemical functions capable of providing specific properties, for example, improved adhesion to the substrate, decreased shrinkage upon polymerization, or improved compatibility and solubility with other components of the anaerobic composition. Examples of such multifunctional acrylates and methacrylates include acrylates and methacrylates of methyl, ethyl, butyl, ethylhexyl, lauryl, 2-hydroxyethyl, 2-hydroxypropyl, tetrahydrofurfuryl, dicyclopentadienyl, dicylpentadienyl-oxyethyl, phenyl, cyclohexyl and 2-phenoxyethyl.

Other unsaturated reactive diluents, such as styrene and acrylonitrile, can also be used as a reactive component, usually in an amount less than about 60%, and preferably in an amount of about 40 to about 10%, by weight of the total composition.

The reactive component(s) are present in the composition in an amount sufficient to provide adhesivity after polymerization. In an embodiment, the amount of the reactive components is at least about 60%, and preferably at least about 70%, by weight of the composition. The amount of the reactive components is up to about 95%, and preferably up to about 90%, by weight of the composition.

Anaerobic adhesive compositions also include a free radical activator/initiator, which provides free radicals to initiate free radical polymerization of the reactive components. Such activators are known in the art and can be incorporated in the present composition in an amount sufficient to initiate free radical polymerization of the reactive components, preferably in an amount of at least about 0.1%, up to about 10%, by weight of the composition. Examples of free radical activators include organic peroxides and hydroperoxides, such as cumene hydroperoxide (CHP), paramenthane hydroperoxide, tertiary butyl hydroperoxide (TBH), and tertiary butyl perbenzoate.

In addition to a reactive component and a free radical activator, the anaerobic adhesive composition of the invention includes microencapsulated metal ions in an amount sufficient to provide enhanced anaerobic curing or polymerization of the monomers in the composition. As used herein, the terms "enhanced anaerobic curing" and "enhanced anaerobic polymerization" are understood to include enhanced cure speed, bonding strength, and/or bonding quality of the anaerobic adhesive composition.

Any metal ion that provides desired cure enhancing properties can be used in the present composition. Examples of such metal ions include transition metals, i.e., the d-block of the periodic table. Preferred examples of metal ions include iron oxide, copper naphthenate, cobalt naphthenate, ferrocene, ferrocene derivatives, and combinations thereof.

Microencapsulated metal ions can be prepared by any suitable known microencapsulation process. In an embodiment, metal ions in liquid form are encapsulated using a batch process. For example, a pre-polymer made with formaldehyde is mixed with water and added to a solution containing metal ions to form microcapsules around metal ions, which are then dried to remove water. In an alternative embodiment, metal ions in powder form are microencapsulated using a spray encapsulation technique. In preferred examples, formaldehyde (formalin), melamine, and/or urea are included in the encapsulating material.

Preferably, the average particle size of microcapsules is about 50 to 300 microns. More preferably, the average particle size is about 200 microns.

To use, microencapsulated metal ions are simply added to and suspended in an anaerobic adhesive composition prepared according to a known method. Microencapsulated metal ions are included in an amount sufficient to provide enhanced anaerobic curing or polymerization of the composition. In an embodiment, microencapsulated metal ions are included in an amount of at least about 0.1%, up to about 7%, and preferably up to about 5%, by weight of the composition. In an example, microencapsulated metal ions are included in an amount of about 0.2 to about 4%, by weight of the composition.

Microencapsulated metal ions suspended in the composition are inactive before the anaerobic polymerization of the composition, as microcapsules protect metal ions from directly contacting the reactive components of the composition, which would cause premature curing of the composition. During the anaerobic curing, when joining substrates are pressed against each other, the resulting pressure causes microcapsules to rupture and release metal ions from the capsules. The released metal ions act as additional bonding sites for the reactive components in the composition to propagate, and thereby facilitate the curing reaction by enhancing the curing network. Further, by increasing the number of bonding sites the reactive components must propagate to complete the curing process, the released metal ions enable more thorough and complete polymerization in a shorter curing time. Because the composition is more completely cured, the quality of the cured composition and the bonding strength between the composition and the substrates are also significantly improved, compared to a composition that does not contain microencapsulated metal ions. In this regard, it should be noted that surfaces of substrates, even metal substrates, have too few, if any, metal ions to help propagate the polymerization reaction of the composition applied thereon.

Because metal ions improve the curing reaction by providing reactive bonding sites internally within the composition, the present composition containing microencapsulated metal ions provides improved curing and bonding results without requiring separate treatments of the substrate. The present composition can also be used to provide enhanced curing and bonding results on any of a wide variety of metal substrate materials, including those known to be relatively inactive, such as stainless steel, zinc, zinc dichromate, and cadmium, as well as plastic substrate materials, which could not be bonded with previously known anaerobic adhesive compositions. The present composition is also advantageous in that it is simple to produce and use and can be used to enhance any given anaerobic adhesive composition.

Microencapsulated metal ions included in an anaerobic adhesive composition according to the invention are distinguished from unencapsulated, bare metal ions that may be present in the composition. Bare metal ions can be introduced into the composition when the composition or its ingredients contact a metal surface, e.g., parts of metal machines or containers, during the manufacture, handling or storage. Such bare metal ions cause premature curing of the composition and are not desired.

The composition can additionally include other known cure enhancing agents, such as an acidic reducing agent and an accelerator for the free radical activator. Such agents are included in an amount sufficient to provide effective reduction or cure acceleration, and the amounts of the agents can be adjusted relative to the amount of the activator to achieve optimal curing properties.

A reducing agent, such as saccharin, can be included to optimize the performance of the activator, since the action of activators such as peroxide and hydroperoxide is inhibited by the presence of oxygen. In an example, the reducing agent is included in an amount of at least about 0.1%, up to about 10% and preferably up to about 5%, by weight of the composition.

Various accelerators for the free radical activator are also known and include nitrogen compounds, such as amines and imides, and hydrazine and hydrizide compounds. Examples of suitable accelerators include aromatic tertiary amines (e.g., dimethylanilines and dimethyl toluidines), polyamines, cyclicamines, arylamines, sulfimides, alkyl hydrizines and hydrizides (e.g., alkyl sulfonyl phenyl hydrazines, 1-acetyl-2-phenyl hydrazine, 1-acetyl-2(p-tolyl) para-toluene sulfonyl hydrazide, and 1-formyl-2-phenyl hydrazine), and combinations thereof. An accelerator is included in an amount of at least about 0.1%, up to about 5% and preferably up to about 2%, by weight of the composition.

An accelerator can be included in combination with various co-accelerators. For example, since a nitrogen compound has an electron "donor" characteristic, a nitrogen-containing accelerator can be used in combination with another compound that has an electron "acceptor" characteristic, such as aromatic sulfimides (e.g., benzoic sulfimide (saccharin)). Such co-accelerator systems are known to increase the reactivity of the anaerobic adhesive composition without negatively affecting its stability when it is stored in the presence of the air.

To control and prevent decomposition of the activator and premature polymerization of the reactive component, a stabilizer and/or an inhibitor can be included in the composition to inhibit oxidation and prevent the untimely polymerization of the reactive component. Phenols such as hydroquinone, quinones, and hindered phenol derivatives (e.g., ditertiobutyl-2,6-methyl-4-phenol) are known to be useful for this purpose. The amount of the stabilizer and inhibitor is adjusted depending on the other ingredients of the composition, and generally ranges from about 0.1% to about 5% by weight of the composition.

If desired, a complexing or chelating agent can be include in an amount of about 0.1% to about 5% by weight of the composition to combat the harmful effects of metal ions and impurities, which can be introduced into the composition with the ingredients of the composition or by contact with metal machines or parts during the manufacture, handling and storage. Unlike microencapsulated metal ions of the invention, which promote and enhance the curing reaction, unencapsulated, bare metal ions cause premature curing of the adhesive composition and should be reduced or eliminated. Examples of chelating agents that can be included in the composition include aminocarboxylates, especially alkaline salts of ethylenediamine tetra-acetic acid (e.g., tetrasodium salt of ethylenediamine tetra-acetic acid (EDTA)); salicyladlehyde; aminophenols; bipyridyl and its derivatives; orthophenanthroline; 8-hydroxyquinoleine; and N,N'-ethylene-bis(2-pyridinecarbaldimine).

Other additives can also be included as desired, to the extent that they do not adversely affect the curing properties of the composition. Examples of known additives include thickening agents or viscosity builders, thixotropic agents, plasticizers, fillers, elastomers, thermoplastics, friction reducers, and coloring agents. The amounts of such additives will vary depending on the type of the additive and the other ingredients in the composition, but generally will range from about 0.1% to about 50% by weight of the composition. For example, a thickening agent such as silica can be included in an amount of at least about 0.1%, up to about 50%, preferably up to about 25%, more preferably up to about 15%, and most preferably up to about 10%, by weight of the composition. A plasticizer can be included in an amount of at least about 0.1%, up to about 50%, preferably in an amount of about 40 to about 50%, by weight of the composition. A friction reducer such as PTFE and polyethylene can be present in an amount of at least about 0.1%, up to about 10%, preferably in an amount of about 1 to about 6%, by weight of the composition. A coloring agent can be included in an amount of at least about 0.1%, up to about 3% and preferably up to about 2%, by weight of the composition.

In an example, the present anaerobic adhesive composition comprises a reactive component of anaerobically curable monomers in an amount of about 60 to about 90%; a free radical activator in an amount of about 0.1 to about 10%; a reducing agent for the activator and/or an accelerator in an amount of about 0.1 to about 10% and about 0.1 to about 5%, respectively; microencapsulated metal ions in an amount of about 0.1 to about 7%; and optional additives such as a thickening agent or a plasticizer in an amount of about 0.1 to about 50%, by weight of the composition.

In a further example, the composition comprises polyglycol dimethacrylate, methacrylate monomer, polyester resin, or polyethylene glycol ether, or a combination thereof, as a reactive component in a total amount of about 70 to about 90% by weight of the composition, each compound being included in an amount of about 15 to about 90%; cumene hydroperoxide in an amount of about 0.5 to about 3% as an activator; saccharin in an amount of about 1 to about 5% as a reducing agent and accelerator for the hydroperoxide; an aromatic amine such as alkyl toluidine in an amount of up to about 2% as an accelerator; microencapsulated metal ions in an amount of about 0.2 to about 2%, by weight of the composition; and, optionally, a thickening agent such as silica in an amount of about 1 to about 5%, by weight of the composition.

The anaerobic adhesive composition prepared according to the invention has numerous utilities, including those as a threadlocker, a sealant, a retaining agent, a gasketing adhesive, and a bonding or attaching adhesive for various substrates and mechanical parts. Further, the inclusion of metal ions, while providing significantly enhanced curing speed and quality, does limit the use of the composition in any manner, such that the composition can be used on substrates of a wide variety of metal and plastic materials.

In addition, it will be appreciated that the inclusion of microencapsulated metal ions according to the invention can also be utilized in other products and compositions that involve free radical polymerization.

The above description and the following example are illustrative only and are not restrictive or limiting.

EXAMPLES

Example 1

Preparation of an Anaerobic Adhesive Composition Containing Microencapsulated Metal Ions Microencapsulated metal ions are prepared in a batch process using the following ingredients. The relative amounts of the ingredients in the encapsulation mixture are also shown below.

| Ingredients for the Microencapsulation Mixture | Amount |
| --- | --- |
| FORMALIN (FORMALDEHYDE) | 0.1984 |
| TRIETHANOLAMINE 99% | 0.00462 |
| UREA PRILLED | 0.0714 |
| MELAMINE | 0.008 |
| DEIONIZED WATER | 0.21698 |
| RHODAFAC RM-710 | 0.0238 |
| FERROCENE | 0.3368 |
| ACETONE | 0.084 |
| HYDROCHLORIC ACID | 0.017 |
| SODIUM HYDROXIDE LIQUID CAUSTIC SODA | 0.015 |
| SILICA (SYLOID 169) | 0.024 |
| TOTAL | 1.000 |

The metal ions are dissolved in a solution containing acetone, hydrochloric acid, sodium hydroxide liquid, and Syloid® 169 silica. Separately, a pre-polymer is formed using formaldehyde, triethanolamine, urea, melamine, and a lubricant such as Rhodafac RM-710, which are mixed with deionized water. The metal ion solution is added to this pre-polymer mixture and the two are mixed, upon which microcapsules enclosing metal ions are formed. The microcapsules are then dried to remove water.

The microcapsules are added to an anaerobic adhesive composition prepared by a known method. The ingredients of the composition and their relative amounts are as follows.

| Ingredients for the Adhesive Composition | Amount |
| --- | --- |
| PEG 200 DMA | 0.68 |
| STABILIZER 1 | 0.0053 |
| STABILIZER 2 | 0.0082 |
| STABILIZER 3 | 0.0053 |
| INSOLUBLE SACCHARIN | 0.0208 |
| N,N-DIETHYL-P-TOLUIDINE | 0.0093 |
| N,N-DIMETHYL-O-TOLUIDINE | 0.0031 |
| DION 382E (polyester) | 0.2331 |
| RED DYE PRE-MIX | 0.0043 |
| D298 COLUMBIA BLUE DAYGLO | 0.0005 |
| CUMENE HYDROPEROXIDE (CHP) | 0.0151 |
| MICROENCAPSULATION COMPONENT | 0.015 |
| TOTAL | 1.000 |

As used herein, the term "about" should generally be understood to refer to both the corresponding number and a range of numbers. In addition, all numerical ranges herein should be understood to include each whole integer within the range. While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. A composition for bonding two substrates to teach other without use of primers, consisting of:
   an anaerobically-curable component;
   an activator comprising a free radical peroxide initiator capable of initiating radical polymerization of the anaerobically-curable component; and
   microencapsulated ferrocenes and/or ferrocene derivatives, wherein the ferrocenes and/or ferrocene derivatives are encapsulated in liquid form within a formaldehyde polymer system, in an amount sufficient to enhance anaerobic polymerization of the anaerobically curable component on the at least two substrates when pressure causes the microcapsules to rupture and release metal ions form the capsules to activate anaerobic polymerization that bonds the substrates;
   wherein the metal ions are present in an amount of about 0.1% to about 7% by weight of the composition;
   wherein said composition bonds the substrates, at least one substrate being selected from stainless steel, zinc, zinc dichromate, cadmium and plastic, and provides enhanced cure speed and bond strength, and optionally further comprising at least one of a reducing agent, an accelerator, a stabilizer, an oxidation inhibitor, a chelating agent, a friction reducer, and a thickening agent.

2. The composition of claim 1, wherein the composition comprises the anaerobically-curable component in an amount of about 60 to about 90%, and the activator in an amount of about 0.1 to about 10, each by weight of the composition.

3. The composition of claim 2, wherein the anaerobically-curable component comprises methacrylate, polyglycol methacrylate, polyglycol dimethacrylate, polyethylene glycol ester, polyester resin, or a combination thereof.

4. The composition of claim 1, wherein the free radical peroxide initiator of the activator comprises a hydroperoxide compound.

5. The composition of claim 1, further comprising at least one of a reducing agent, an accelerator, a stabilizer, an oxidation inhibitor, a chelating agent, a friction reducer, and a thickening agent.

6. The composition of claim 1, wherein the composition comprises the anaerobically-curable component in an amount of about 60 to about 90%, the activator in an amount of about 0.1 to about 10%, and at least one of the reducing agent in an amount of about 0.1 to about 10%, the accelerator in an amount of about 0.1 to about 5%, the thickening agent in an amount of about 0.1 to about 15%, and the friction reducer in an amount of about 1 to about 6%, each by weight of the composition.

7. The composition of claim 5, wherein the free radical peroxide initiator of the activator comprises a hydroperoxide compound, the reducing agent comprises saccharin, and the accelerator comprises alkyl toluidine or 1-acetyl-2-phenyl hydrazine or both.

8. The composition of claim 1, wherein the anaerobically-curable component comprises methacrylate, polyglycol methacrylate, polyglycol dimethacrylate, polyethylene glycol ester, polyester resin, or a combination thereof in an amount of about 60 to about 90%; the free radical peroxide initiator of the activator comprises a hydroperoxide in an amount of about 0.1 to about 10%, each by weight of the composition, and wherein the composition further comprises at least one of saccharin in an amount of about 0.1 to about 10%, an amine in an amount of about 0.1 to about 5%, and silica in an amount of about 0.1 to about 15%, each by weight of the composition.

\* \* \* \* \*

UNITED STATES PATENT AND TRADEMARK OFFICE
CERTIFICATE OF CORRECTION

| | | |
|---|---|---|
| PATENT NO. | : 8,865,794 B2 | Page 1 of 1 |
| APPLICATION NO. | : 12/059730 | |
| DATED | : October 21, 2014 | |
| INVENTOR(S) | : Wallace et al. | |

It is certified that error appears in the above-identified patent and that said Letters Patent is hereby corrected as shown below:

IN THE CLAIMS:

claim 2, column 10, line 7, insert --%-- after "10";
claim 7, column 10, line 31, delete "5" and insert --6--.

Signed and Sealed this
Seventeenth Day of February, 2015

Michelle K. Lee
*Deputy Director of the United States Patent and Trademark Office*